(12) United States Patent
Kern et al.

(10) Patent No.: US 8,478,767 B2
(45) Date of Patent: Jul. 2, 2013

(54) SYSTEMS AND METHODS FOR GENERATING ENHANCED SCREENSHOTS

(76) Inventors: Mark Kern, Aliso Viejo, CA (US); David Nikdel, Cary, NC (US); Scott Youngblood, Aliso Viejo, CA (US)

( * ) Notice: Subject to any disclaimer, the term of this patent is extended or adjusted under 35 U.S.C. 154(b) by 0 days.

(21) Appl. No.: 13/536,971

(22) Filed: Jun. 28, 2012

(65) Prior Publication Data

US 2012/0269394 A1 Oct. 25, 2012

Related U.S. Application Data

(63) Continuation of application No. 13/008,854, filed on Jan. 18, 2011.

(51) Int. Cl.
*G06F 7/00* (2006.01)
*G06F 17/30* (2006.01)

(52) U.S. Cl.
USPC ........... 707/756; 707/793; 715/234; 715/273; 725/117; 463/31

(58) Field of Classification Search
None
See application file for complete search history.

(56) References Cited

U.S. PATENT DOCUMENTS

| | | | |
|---|---|---|---|
| 5,384,910 A | 1/1995 | Torres | |
| 6,374,336 B1 | 4/2002 | Peters et al. | |
| 6,466,275 B1 | 10/2002 | Honey et al. | |
| 6,629,129 B1 | 9/2003 | Bookspan et al. | |
| 6,699,127 B1 | 3/2004 | Lobb et al. | |
| 6,864,886 B1 | 3/2005 | Cavallaro et al. | |
| 7,390,254 B2 | 6/2008 | Hirai | |
| 7,827,560 B2 | 11/2010 | Bayer | |
| 7,917,632 B2 | 3/2011 | Lee et al. | |
| 7,970,820 B1 | 6/2011 | Sivasubramanian et al. | |
| 8,128,503 B1 | 3/2012 | Haot et al. | |
| 2004/0087363 A1 | 5/2004 | Bogenn | |
| 2004/0116183 A1 | 6/2004 | Prindle | |
| 2004/0153569 A1 | 8/2004 | Savathphoune | |
| 2004/0248631 A1 | 12/2004 | Hirai | |
| 2006/0098013 A1 | 5/2006 | Wong et al. | |
| 2007/0117617 A1 | 5/2007 | Spanton et al. | |
| 2007/0250901 A1 | 10/2007 | McIntire et al. | |
| 2007/0256030 A1 | 11/2007 | Bedingfield, Sr. | |
| 2008/0026839 A1* | 1/2008 | Alringer | 463/31 |

(Continued)

OTHER PUBLICATIONS

BlamDarot, "Achievement Screenshotter", World of Warcraft Mod, Created Jul. 3, 2009, Last Updated Nov. 4, 2010, description accessed at http://wow.curseforge.com/addons/achievement-screenshotter on Feb. 15, 2013.*

(Continued)

*Primary Examiner* — Michael Hicks

(57) ABSTRACT

Systems and methods for generating and providing enhanced screenshots may include executing instructions stored in memory to evaluate at least a portion of a viewing frustum generated by the instructions to determine one or more objects included therein, obtain metadata associated with the one or more objects, and generate at least one enhanced screenshot indicative of the at least a portion of the viewing frustum by associating the metadata of each of the one or more objects with a location of each of the one or more objects within the at least one enhanced screenshot to create hotspots indicative of each of the one or more objects such that selection at least one hotspot by a computing system causes at least a portion of the metadata associated with the at least one hotspot to be displayed on a display device of a computing system.

20 Claims, 5 Drawing Sheets

U.S. PATENT DOCUMENTS

| | | | |
|---|---|---|---|
| 2008/0071907 | A1 | 3/2008 | Thompson |
| 2009/0083662 | A1* | 3/2009 | Fitzmaurice et al. ......... 715/810 |
| 2009/0118017 | A1 | 5/2009 | Perlman et al. |
| 2009/0118018 | A1 | 5/2009 | Perlman et al. |
| 2009/0118019 | A1 | 5/2009 | Perlman et al. |
| 2009/0118020 | A1 | 5/2009 | Koivisto et al. |
| 2009/0124387 | A1 | 5/2009 | Perlman et al. |
| 2009/0172171 | A1 | 7/2009 | Amir |
| 2009/0208181 | A1 | 8/2009 | Cottrell |
| 2009/0215531 | A1 | 8/2009 | Perlman et al. |
| 2009/0215540 | A1 | 8/2009 | Perlman et al. |
| 2009/0249189 | A1* | 10/2009 | Jania et al. .................... 715/234 |
| 2009/0290753 | A1 | 11/2009 | Liu et al. |
| 2009/0297118 | A1 | 12/2009 | Fink et al. |
| 2009/0326970 | A1 | 12/2009 | Estrada et al. |
| 2010/0154050 | A1 | 6/2010 | Mukkara et al. |
| 2010/0167809 | A1 | 7/2010 | Perlman et al. |
| 2010/0167816 | A1 | 7/2010 | Perlman et al. |
| 2010/0169964 | A1 | 7/2010 | Liu et al. |
| 2011/0013087 | A1 | 1/2011 | House et al. |
| 2011/0093600 | A1 | 4/2011 | Lee et al. |
| 2011/0105226 | A1 | 5/2011 | Perlman |
| 2011/0111854 | A1 | 5/2011 | Roberts et al. |
| 2011/0145880 | A1* | 6/2011 | Wang ............................ 725/117 |
| 2011/0151971 | A1 | 6/2011 | Altshuler et al. |
| 2011/0161666 | A1 | 6/2011 | Gladwin et al. |
| 2011/0238618 | A1 | 9/2011 | Valdiserri et al. |
| 2012/0142433 | A1 | 6/2012 | Perlman et al. |
| 2012/0149476 | A1 | 6/2012 | Perlman et al. |
| 2012/0151346 | A1 | 6/2012 | McClements, IV |
| 2012/0151347 | A1 | 6/2012 | McClements, IV |
| 2012/0204107 | A1 | 8/2012 | Salinas |
| 2012/0311624 | A1 | 12/2012 | Oskolkov et al. |

OTHER PUBLICATIONS

Rytych, "Game-like environments for nuclear engineering education using GECK", 1st International Nuclear & Renewable Energy Conference (INREC), pp. 1-5, IEEE, Mar. 2010.*
Extended European Search Report with mail date of Jan. 8, 2013, re European Application No. 12170200.5 filed May 31, 2012.
International Search Report mailed Feb. 21, 2013 in application No. PCT/US2012/20007, filed Jan. 12, 2012.
Extended European Search Report, Mailing Date May 4, 2012, Application No. 11006996.0, Application Filing Date Aug. 26, 2011.
Non-Final Office Action, Mailing Date Mar. 4, 2013, Application No. 11006996.0, Application Filing Date Aug. 26, 2011.
Extended European Search Report, Mailing Date Mar. 30, 2012, Application No. 12151200.8, Application Filing Date Jan. 16, 2012.
Non-Final Office Action, Mailing Date Dec. 20, 2012, U.S. Appl. No. 12/869,615, Application Filing Date Aug. 26, 2011.
Non-Final Office Action, Mailing Date Oct. 16, 2012, U.S. Appl. No. 13/008,854, Application Filing Date Jan. 18, 2011.
Final Office Action, Mailing Date Apr. 29, 2013, U.S. Appl. No. 13/008,854, Application Filing Date Jan. 18, 2011.
Extended European Search Report, Mailing Date Dec. 3, 2012, Application No. 12170191.6, Application Filing Date May 31, 2012.
Non-Final Office Action, Mailing Date Nov. 30, 2012, U.S. Appl. No. 13/228,285, Application Filing Date Sep. 8, 2011.
Non-Final Office Action, Mailing Date Aug. 14, 2012, U.S. Appl. No. 13/191,321, Application Filing Date Jul. 26, 2011.
Non-Final Office Action, Mailing Date Dec. 19, 2012, U.S. Appl. No. 13/538,674, Application Filing Date Jun. 29, 2012.
Non-Final Office Action, Mailing Date Nov. 30, 2012, U.S. Appl. No. 13/536,941, Application Filing Date Jun. 28, 2012.
Non-Final Office Action, Mailing Date Dec. 5, 2012, U.S. Appl. No. 13/536,943, Application Filing Date Jun. 28, 2012.
Non-Final Office Action, Mailing Date Jun. 20, 2012, U.S. Appl. No. 13/342,185, Application Filing Date Jan. 2, 2012.
Non-Final Office Action, Mailing Date Oct. 24, 2012, U.S. Appl. No. 13/342,185, Application Filing Date Jan. 2, 2012.
Non-Final Office Action, Mailing Date Oct. 22, 2012, U.S. Appl. No. 13/536,965, Application Filing Date Jun. 28, 2012.
Advisory Action, Mailing Date May 8, 2013, U.S. Appl. No. 13/342,185, Application Filing Date Jan. 2, 2012.
Final Office Action, Mailing Date May 1, 2013, U.S. Appl. No. 13/536,965, Application Filing Date Jun. 28, 2012.
Non-Final Office Action, Mailing Date Aug. 16, 2012, U.S. Appl. No. 13/467,809, Application Filing Date May 9, 2012.
Advisory Action, Mailing Date May 14, 2013, U.S. Appl. No. 13/467,809, Application Filing Date May 9, 2012.
Non-Final Office Action, Mailing Date Aug. 14, 2012, U.S. Appl. No. 13/467,867, Application Filing Date May 9, 2012.
Final Office Action, Mailing Date Dec. 21, 2012, U.S. Appl. No. 13/467,867, Application Filing Date May 9, 2012.
Non-Final Office Action, Mailing Date Apr. 22, 2013, U.S. Appl. No. 13/467,867, Application Filing Date May 9, 2012.
Non-Final Office Action, Mailing Date Dec. 19, 2012, U.S. Appl. No. 13/558,158, Application Filing Date Jul. 5, 2012.
Final Office Action, Mailing Date Apr. 18, 2013, U.S. Appl. No. 13/558,158, Application Filing Date Jul. 5, 2012.
Non-Final Office Action, Mailing Date Nov. 15, 2012, U.S. Appl. No. 13/549,375, Application Filing Date Jul. 13, 2012.
Final Office Action, Mailing Date Apr. 25, 2013, U.S. Appl. No. 13/559,375, Application Filing Date Jul. 13, 2012.
Non-Final Office Action, Mailing Date Nov. 9, 2012, U.S. Appl. No. 13/555,049, Application Filing Date Jul. 20, 2012.
Non-Final Office Action, Mailing Date Dec. 19, 2012, U.S. Appl. No. 13/538,757, Application Filing Date Jun. 29, 2012.

* cited by examiner

SYSTEMS AND METHODS FOR GENERATING ENHANCED SCREENSHOTS

CROSS-REFERENCE TO RELATED APPLICATION

The present application is a continuation of U.S. patent application Ser. No. 13/008,854, filed Jan. 18, 2011 and entitled "Systems and Methods for Generating Enhanced Screenshots," which is herein incorporated by reference.

FIELD OF THE INVENTION

The present invention relates generally to systems and methods for generating enhanced screenshots, and more particularly, but not by way of limitation, to systems and methods to generate enhanced screenshots that include metadata indicative of objects located within the enhanced screenshots.

SUMMARY OF THE INVENTION

According to exemplary embodiments, the present invention provides for methods for generating enhanced screenshots that include executing instructions stored in memory to: (a) evaluate at least a portion of a viewing frustum generated by the instructions to determine one or more objects included therein; (b) obtain metadata associated with at least one of the one or more objects; (c) generate at least one enhanced screenshot indicative of the at least a portion of the viewing frustum by associating the metadata of each of the one or more objects with a location of each of the one or more objects within the at least one enhanced screenshot to create hotspots indicative of each of the one or more objects such that selection at least one hotspot by a computing system causes at least a portion of the metadata associated with the at least one hotspot to be displayed on a display device of a computing system; and (d) provide the at least one enhanced screenshot to the computing system for display on the display device of the computing system.

According to other exemplary embodiments, the present invention provides for systems for generating enhanced screenshots that may include (a) a memory for storing a computer program; (b) a processor for executing the computer program stored in memory, the computer program adapted to generate a viewing frustum that includes one or more objects, the computing program including a screenshot generation module that includes: (i) a parsing module adapted to evaluate at least a portion of the viewing frustum to determine one or more objects included therein; (ii) an analysis module adapted to obtain metadata associated with at least one of the one or more objects; (iii) an assembly module adapted to generate at least one enhanced screenshot indicative of the at least a portion of the viewing frustum by associating the metadata of each of the one or more objects with a location of each of the one or more objects within the at least one enhanced screenshot to create hotspots indicative of each of the one or more objects such that selection at least one hotspot by a computing system causes at least a portion of the metadata associated with the at least one hotspot to be displayed on a display device of a computing system; and (iv) an interface module adapted to provide the at least one enhanced screenshot to the computing system for display on the display device of the computing system.

According to additional exemplary embodiments, the present invention provides for non-transitory computer readable storage mediums having embodied thereon a program, the program being executable by a processor to perform a method for generating a viewing frustum that includes one or more objects, the program further including an enhanced screenshot engine adapted to: (a) evaluate at least a portion of the viewing frustum to determine one or more objects included within the viewing frustum; (b) obtain metadata associated with at least one of the one or more objects; (c) generate at least one enhanced screenshot indicative of the at least a portion of the viewing frustum by associating the metadata of each of the one or more objects with a location of each of the one or more objects within the at least one enhanced screenshot to create hotspots indicative of each of the one or more objects such that selection at least one hotspot by a computing system causes at least a portion of the metadata associated with the at least one hotspot to be displayed on a display device of a computing system; and (iv) provide the at least one enhanced screenshot to the computing system for display on the display device of the computing system.

According to some exemplary embodiments, the present invention provides for methods for providing an award for obtaining one or more enhanced screenshots during execution of computer-readable instructions that generate a viewing frustum that includes one or more objects. The methods may include: (a) comparing metadata of at least one of the one or more objects included in one or more enhanced screenshots obtained by a computing system to an established award criteria, the award criteria including information indicative of metadata included in one or more enhanced screenshots that when obtained allow at least one award to be provided to the computing system; and (b) providing an award to the computing system upon the computing system obtaining one or more enhanced screenshots having metadata that correspond to the award criteria.

DETAILED DESCRIPTION OF EXEMPLARY EMBODIMENTS

Figure 1:
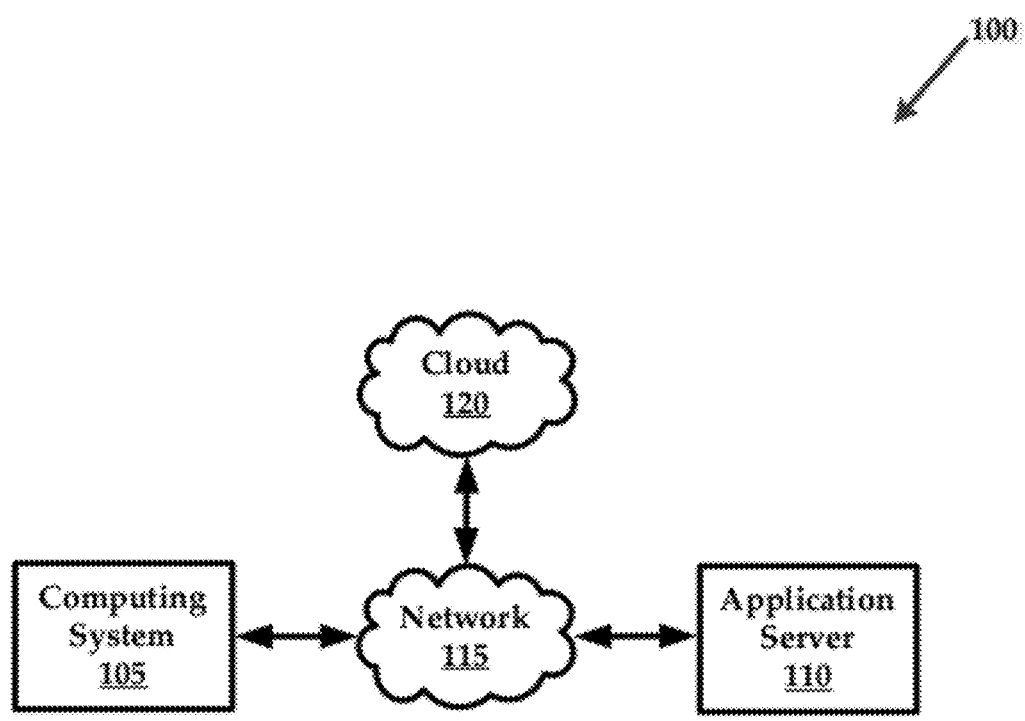
FIG. 1 is a schematic diagram of an exemplary environment for practicing the present invention.

The capturing and utilization of screenshots is well known in the art. As background, screenshots are image files taken by a computing system to record the visual depictions, also known as views, displayed on a display device such as a monitor associated with the computing system. The screenshots are typically captured by at least one of a standalone screenshot application, screenshot functionalities embedded within computer programs or executable instructions stored in memory, and also screenshot functionalities incorporated into operating system software. It will be understood that the term "view" may include any visual depiction of data generated by a graphics engine or an interface module of a computer program such as a graphical user interface. While the term "view" has been referred to in the singular, it is noteworthy that the word view may include a singular view generated periodically or a plurality of views, such as a continuous view of a program environment generated by a computer program, as will be discussed in greater detail herein.

Additionally, screenshots may also be referred to as screen captures (screencap), screen dump, screen grab, or more formally as a print screen function. The print screen function may be generally described as a screenshot function operatively associated with one or more keys of a keyboard device that is associated with the computing system.

While systems and methods for obtaining screenshots are well known, they only provide the limited functionality of capturing the view in a standardized image file format. These image files contain relatively little, if any, information indicative of the type of information contained within the image file, such as the objects located therein. For example, a videogame program may include executable instructions stored in memory that generate and display a continuously updated view in the form of a graphical user interface with which the user may interact. During run time, the user may capture screenshots of the view. Unfortunately, these common screenshots provide the user with no additional information regarding the program environment other than what may be visually ascertained by the user on the display device of their computing system.

The systems and methods of the present disclosure are adapted to generate enhanced screenshots that are content rich relative to standard screenshots thereby providing the user with a host of additional information that may not be readily ascertained by visual inspection of the screenshot.

The systems and methods may generate an enhanced screenshot by capturing an image file indicative of at least a portion of the view and intelligently appending metadata to objects located within the screenshot by mapping the location of each of the objects to one or more pixels of the captured image file to create hotspots indicative of the objects. According to some embodiments, each hotspot may be approximated and defined by a rectangular shape, although one of ordinary skill in the art with the present disclosure before them will appreciate that other geometrical configurations may be utilized, such as square, triangular, or other suitable polygonal configurations.

The enhanced screenshot may be generated having any one of a number of formats including, but not limited to, extensible markup language documents (XML). It will be understood that the enhanced screenshot may be generated utilizing any one of a number of formats that are adapted to generate screenshots that resemble a conventional screenshot, but when users select a hotspot on the enhanced screenshot, at least a portion of the metadata associated with the hotspot may be displayed on the display device of the computing system. It will be understood that "select" may include, for example, mousing over the hotspot, hovering a selector device over the hotspot, or otherwise contacting the hotspot.

Metadata may be displayed on the computing system in the form of textual information included in a popup window that is displayed proximate the hotspot.

It will be understood that the term "hotspot" may include any area of interest located within an enhanced screenshot that has been intelligently appended with metadata. Hotspots represent the location of objects within the enhanced screenshot and may each be defined by a rectangular boundary that encloses at least a portion of an object.

It will be understood that the term "object" may any visual item located within the enhanced screenshot, including, but not limited to, avatars, buildings, trees, clouds, and the like. It will further be understood that each object may be generally categorized as either animate or inanimate. For example, animate objects may include avatars, enemies, animals, and the like. On the other hand, inanimate objects may include buildings, mountains, and the like.

Additionally, the term "avatar" may be understood to include a specific type of object that is associated the computing system of an end user and includes visual representation of the computing system that operate within the programming environment. Non-limiting examples of avatars may include avatars that have a visual appearance that closely approximates the physical appearance of the end user associated therewith, or may include avatars having a fanciful or whimsical appearance.

With regard to generating a view of the program environment in either two- or three-dimensional, a graphics engine (not shown) associated with the computing system may utilize what is commonly known as a viewing frustum. The viewing frustum may be described as a visual boundary abstraction that approximates a user's field of view. It will be understood that the geometrical configuration of the viewing frustum may depend upon the type of view being simulated. Only objects or portions of objects located within the viewing frustum are rendered by the graphics engine as a view that is displayed via the display device of the computing system. Therefore, as an avatar traverses through the program environment and objects enter and exit the viewing frustum, the objects are rendered (e.g., generated) by the graphics engine and displayed in a format that is perceivable to the user. It will be understood that in some embodiments, the graphics engine may include an interface module such as the interface module 305a described in greater detail with reference to FIG. 3.

Broadly speaking, enhanced screenshots generated by the systems and methods described herein may be utilized to capture or depict the relationship between the view provided to the display device of the computing system and the objects located within the viewing frustum. Moreover, as the enhanced screenshot includes metadata indicative of the objects located within the enhanced screenshot and the metadata indicative of the conditions under which the enhanced screenshot was obtained, additional end users viewing the enhanced screenshot may even more fully appreciate the relationship between the end user for which the enhanced screenshot was captured and the objects located within the enhanced screenshot.

FIG. 1 illustrates an exemplary environment 100 for practicing the present invention. In general, the environment 100 may include a computing system 105 having one or more computer programs (e.g., a videogame program including executable instructions that generate a viewing frustum that includes one or more objects) residing thereon. In additional exemplary embodiments, the exemplary environment 100 may include both the computing system 105 and an application server 110 cooperating together to execute separate components (e.g., module, engine, and the like) of a computer program. As used throughout, the term "computer program" may comprise any type of executable instructions stored in memory and executable by the processor of a computing system. The computing system 105 and the application server 110 may be operatively connected to one another via a network 115 such as the Internet, a local area network, or any other suitable type of communications channel that would be known to one of ordinary skill in the art with the present disclosure before them.

According to some embodiments, the application server 110 may include a plurality of application servers 110 having portions of the computer program distributed therebetween. It will be understood that a portion of the one or more computer programs may alternatively reside in a cloud based computing arrangement 120.

Figure 2:
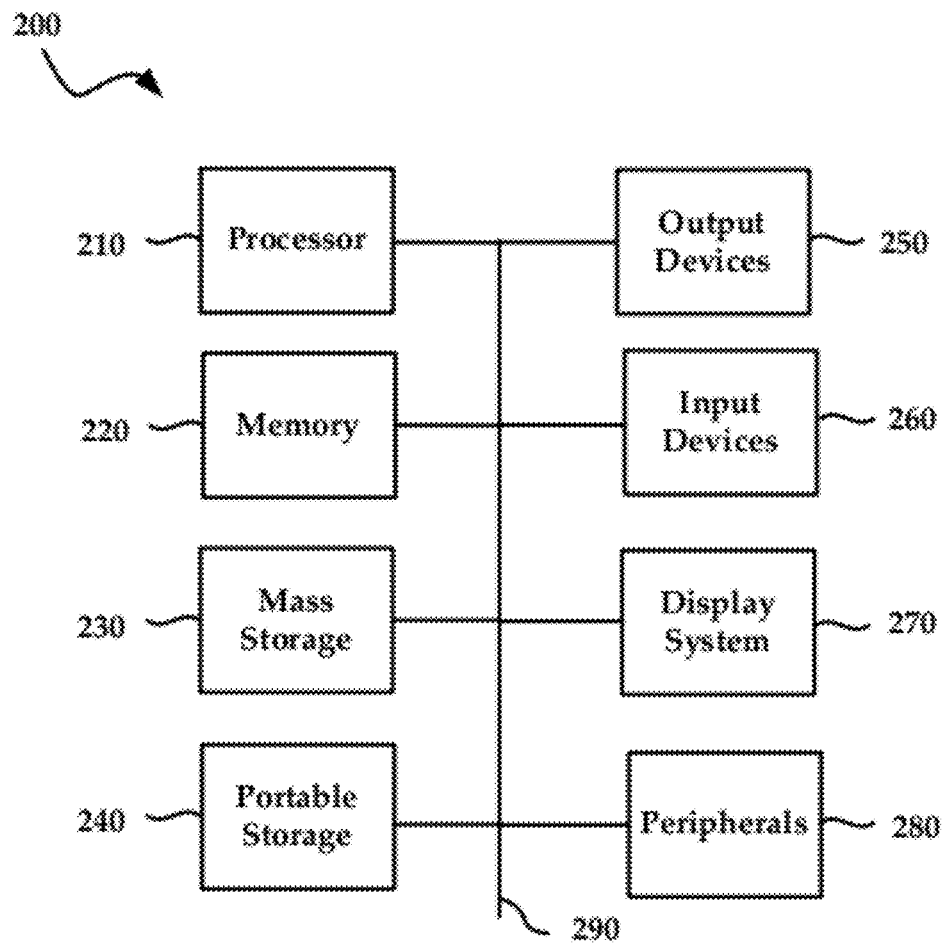
FIG. 2 illustrates an exemplary computing system that may be used to implement embodiments of the present technology.

FIG. 2 illustrates an exemplary computing system 200 that may be used to implement embodiments of the present technology. The system 200 of FIG. 2 may be implemented in the contexts of the likes of the computing system 105 or the application server 110 (see FIG. 1). Therefore, the computing system 200 utilized to implement the methods described herein may be referred to as a particular purpose computing system adapted to generate enhanced screenshots by translating one or more views generated by a computer program into enhanced screenshots that include intelligently appended metadata associated with each of the one or more objects located therein.

The computing system 200 of FIG. 2 includes one or more processors 210 and main memory 220. Main memory 220 stores, in part, instructions and data for execution by processor 210. Main memory 220 may store the executable code when in operation. The system 200 of FIG. 2 further includes a mass storage device 230, portable storage medium drive(s) 240, output devices 250, user input devices 260, a graphics display 270, and peripheral devices 280.

The components shown in FIG. 2 are depicted as being connected via a single bus 290. The components may be connected through one or more data transport means. Processor unit 210 and main memory 220 may be connected via a local microprocessor bus, and the mass storage device 230, peripheral device(s) 280, portable storage device 240, and display system 270 may be connected via one or more input/output (I/O) buses.

Mass storage device 230, which may be implemented with a magnetic disk drive or an optical disk drive, is a non-volatile storage device for storing data and instructions for use by processor unit 210. Mass storage device 230 may store the system software for implementing embodiments of the present invention for purposes of loading that software into main memory 220.

Portable storage device 240 operates in conjunction with a portable non-volatile storage medium, such as a floppy disk, compact disk, digital video disc, or USB storage device, to input and output data and code to and from the computing system 200 of FIG. 2. The system software for implementing embodiments of the present invention may be stored on such a portable medium and input to the computing system 200 via the portable storage device 240.

Input devices 260 may include an alphanumeric keypad, such as a keyboard, for inputting alpha-numeric and other information, or a pointing device, such as a mouse, a trackball, stylus, or cursor direction keys. Additionally, the system 200 as shown in FIG. 2 includes output devices 250. Suitable output devices include speakers, printers, network interfaces, and monitors.

Display system 270 may include a liquid crystal display (LCD) or other suitable display device. Display system 270 receives textual and graphical information, and processes the information for output to the display device.

Peripherals 280 may include any type of computer support device to add additional functionality to the computing system. Peripheral device(s) 280 may include a modem or a router.

The components provided in the computing system 200 of FIG. 2 are those typically found in computing systems that may be suitable for use with embodiments of the present invention and are intended to represent a broad category of such computer components that are well known in the art. Thus, the computing system 200 of FIG. 2 may be a personal computer, hand held computing system, telephone, mobile computing system, workstation, server, minicomputer, mainframe computer, or any other computing system. The computer may also include different bus configurations, networked platforms, multi-processor platforms, etc. Various operating systems may be used including Unix, Linux, Windows, Macintosh OS, Palm OS, Android, iPhone OS and other suitable operating systems.

It is noteworthy that any hardware platform suitable for performing the processing described herein is suitable for use with the technology. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

Figure 3:
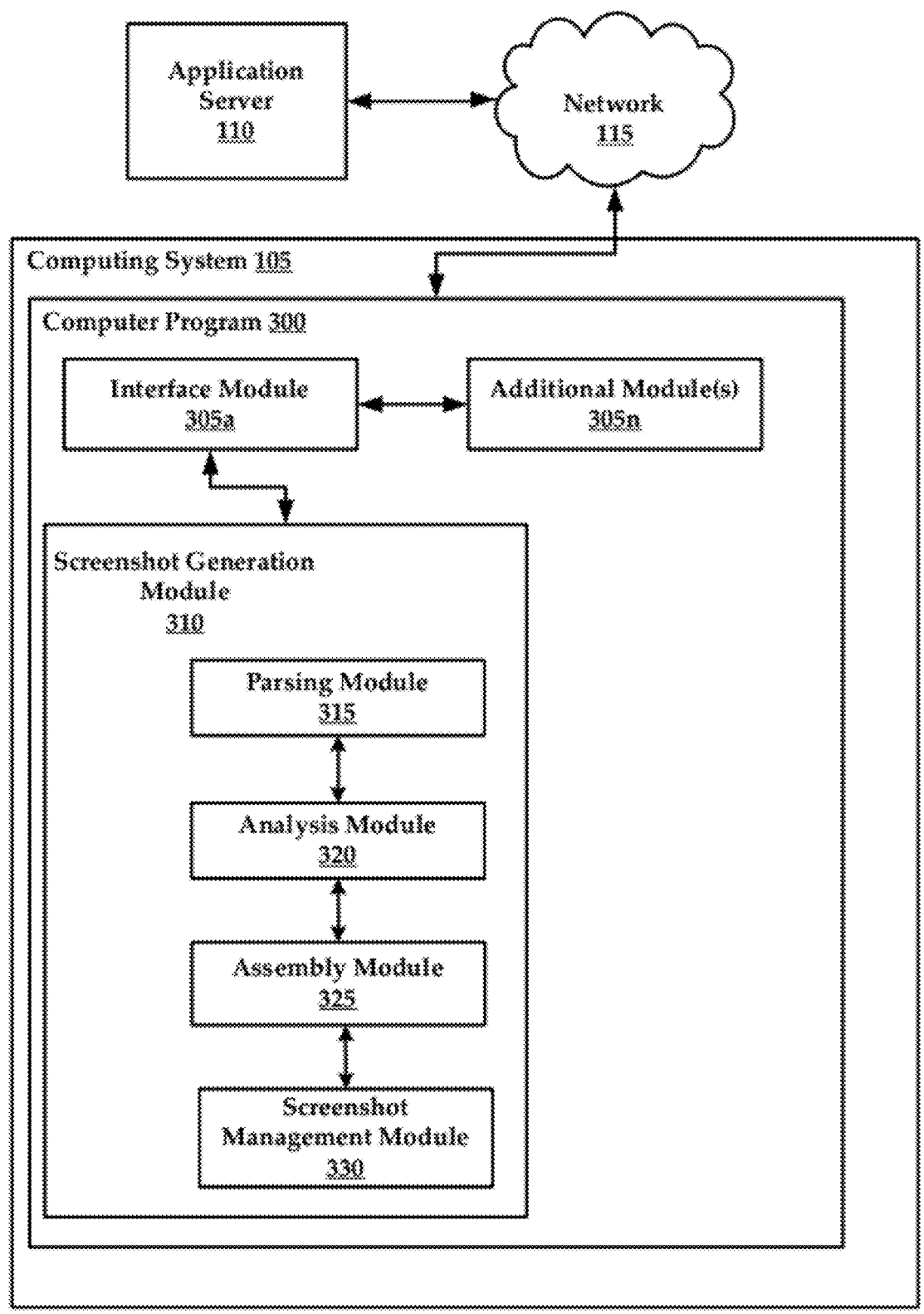
FIG. 3 is a schematic of an exemplary architecture of a computer program having a screenshot generation module, constructed in accordance with the present disclosure.

FIG. 3 illustrates an exemplary block diagram of a computer program 300 for practicing the invention. According to some embodiments, the computer program 300 (e.g., executable instructions stored in memory) resides on the computing system 105 (or application server 110). It will be understood that the computer program 300 may include any computer readable code that is executable by the processor of a computing system that is adapted to provide a view of data (e.g., program environment) produced by the computer program. Therefore, generally speaking, the computer program 300 may include an interface module 305*a* and one or more additional modules 305*n* that generate data that may be utilized by the interface module 305*a* to generate a view of a program environment maintained by the computer program 300. It will be understood that the one or more additional modules 305*n* may likewise include engines, applications, or combinations thereof.

Moreover, to generate enhanced screenshots of the view generated by the interface module 305, the computer program 300 may also include a screenshot generation module 310 that includes a parsing module 315, an analysis module 320 (a.k.a., statistical engine), an assembly module 325, and an optional screenshot management module 330. It will be understood that the constituent modules of the screenshot generation module 310 may be executed by a processor of the computing system to effectuate respective functionalities attributed thereto. It is noteworthy that the screenshot generation module 310 may be composed of more or fewer modules and engines (or combinations of the same) and still fall within the scope of the present technology. For example, the functionalities of the parsing module 315 and the functionalities of the analysis module 320 may be combined into a single module or engine.

For the sake of brevity, although the computer program 300 may include any one (or combination) of a number of computer programs, only a detailed discussion of executable instructions that generate a viewing frustum that includes one or more objects, such as a videogame program, will be set forth in greater detail. The executable instructions that generate, manage, and display a view of a program environment indicative of a viewing frustum are also provided.

As background, software architects create computer-readable instructions that function as a basis for generating and managing a program environment.

The program environment may generally include a landscape that includes a variety of objects. Each of the objects may include both static and dynamic or "run time" metadata indicative of the attributes of the object. For example, an object such as an avatar may include static information such as age, height, weight, name, and the like, associated with the avatar. These types of static metadata are typically input or generated during the creation of the executable instructions or during creation of the avatar by the end user. Run time or "dynamic" metadata may include information that may change over time such as an avatar's health status, an avatar's inventory, an avatar's time of play, interactions between an avatar and one or more avatars, an avatar's accomplishments, and the like. Additionally, run time metadata may include the dynamic location of an avatar within the program environment, which when captured may be provided in the form of a virtual geotag (e.g., a metadata tag indicative of the virtual location of an avatar).

As previously described, the objects located within the landscape may include both animate (e.g., animals, humans, avatars, etc.) and inanimate (e.g., furniture, structures, etc.) objects. An exemplary program environment is described in greater detail with regards to FIG. 5.

Objects that are inanimate may include metadata such as name, location, color, date of creation, and the like. Objects that are animate may also include similar static metadata, but their ability to traverse within the program environment may require monitoring of their locations during run time. Some animate objects traverse within the program environment based upon predefined movements that are predefined by the executable instructions. On the other hand, additional types of user-controlled animate objects may require monitoring, as their movements are not predefined.

For example, the executable instructions may be adapted to facilitate the use of avatars that may selectively operate within the program environment based upon interaction with the executable instructions via end users associated with the avatars.

Because the executable instructions may be adapted to monitor the location of each object within the program environment, the executable instructions may be adapted to generate a view (e.g., user interface) that may be indicative of the particular location at which an avatar is located relative to the program environment.

During run time, the screenshot generation module 310 may be adapted to receive requests to generate an enhanced screenshot from the computing system 105. For example, the user may select a particular key on a keyboard or other input device that is operatively connected to the computing system 105. According to other embodiments, the screenshot generation module 310 may be adapted to generate one or more enhanced screenshots automatically at predetermined intervals of time. Additionally, in some embodiments, the screenshot generation module 310 may be adapted to generate one or more enhanced screenshots upon the occurrence of at least one condition.

By way of non-limiting example, the screenshot generation module 310 may generate one or more enhanced screenshots each time a particular object or group of objects enters the view frustum.

In additional embodiments, the screenshot generation module 310 may generate one or more enhanced screenshots each time an amount of objects within the viewing frustum meets or exceeds a threshold amount. For example, a threshold may be established such that when four or more avatars enter the viewing frustum an enhanced screenshot is generated.

It will be understood that the at least one condition may be predefined by within the executable instructions. For example, the executable instructions may be adapted to generate at least one enhanced screenshot each time a user accomplishes a particular type of achievement.

According to other embodiments, the at least one condition may be user-defined. As such, the optional screenshot management module 330 may be adapted to cause the interface module 305a to generate a graphical user interface (not shown) that allows users to input information indicative of at least one condition. Moreover, the users may be allowed to input information indicative of the type of metadata that they would like to obtain for objects located in the enhanced screenshot. For example, the user may determine that they would like to receive only run time dynamic metadata.

An additional example includes the screenshot generation module 310 generating a plurality of sequential enhanced screenshots upon the occurrence of a particular event such as when a user is attacked by another object such as the avatar of another user. As the screenshot generation module 310 generates a plurality of sequential enhanced screenshots, the user may utilize the screenshots to conduct a forensic analysis of the event. Moreover, the use of statistical data calculated by the analysis module 320 may aid in a forensic analysis of the event.

According to other embodiments, the screenshot generation module 310 may be adapted to generate a slideshow of enhanced screenshots that were taken within a particular range of time (e.g., event). The enhanced screenshots may be arranged in a chronological manner such that end users may browse through a temporal sequence of enhanced screenshots for the range of time.

In some embodiments, the screenshot generation module 310 may be adapted to generate an enhanced video, rather than a plurality of sequential enhanced screenshots.

Regardless of the way in which a request to obtain an enhanced screenshot is received, the parsing module 315 may be adapted to determine each object located within the view being displayed to the user.

After determining each of the objects, the analysis module 320 may be adapted to identify a location for each of the objects relative to the program environment utilizing the viewing frustum. For example, a location for each object may be determined utilizing a two or three point Cartesian coordinate system (depending upon whether the executable instructions utilizes two or three dimensional graphical data), although other methods or systems for determining the location of objects within a program environment that would be known to one of ordinary skill in the art with the present disclosure before them are likewise contemplated for use in accordance with the present invention.

Utilizing the location of the object within the program environment, the analysis module 320 may determine metadata associated with the determined coordinates. For example, a static object such as a building may include metadata indicative of the location of the building within the program environment, along with other useful information such as a building name, a building height, or building age—just to name a few. Therefore, the analysis module 320 may locate at least a portion of the metadata of the building. The analysis module 320 may likewise locate metadata for additional objects located within the viewing frustum.

With regard to three-dimensional videogame programs (e.g., executable instructions that generate a simulated three dimensional view), because of the added spatial dimensions of length and height, and the ability of the analysis module 320 to determine the location of each object within the viewing frustum relative to the location of the objects within the program environment, the analysis module 320 may be adapted to acquire additional types of run time metadata such a distance between two or more objects or the velocity of an object.

The analysis module 320 may be adapted to generate and utilize comparative metadata indicative of a comparison of the metadata of a first user represented by a first object located within the viewing frustum and the metadata of one or more additional users represented by one or more objects also located within the viewing frustum when the at least one enhanced screenshot was generated. For example, the analysis module 320 may be adapted to provide differential health status information indicative of a difference between the health statuses of two separate avatars engaging one another in combat. The analysis module 320 may be utilized to determine various types of additional statistical data representative of objects located within one or more enhanced screenshots. This statistical data may also be intelligently appended to the enhanced screenshot as metadata.

Once the analysis module 320 locates the metadata associated with one or more of the objects within the viewing frustum, the assembly module 325 may be adapted to generate one or more enhanced screenshots indicative of at least a portion of the viewing frustum. According to some embodiments, the assembly module 325 may capture the at least a portion of the viewing frustum that has been rendered as a view by the interface module 305a that may be displayed on the computing system 105 as an image file. The analysis module 320 then appends pertinent metadata to hotspots indicative of each of the objects located within the image file.

The assembly module 325 may be adapted to map the objects determined by their location within the program environment to a pixel or range of pixels within the captured image file. For example, if the parsing module 315 determines that a building is located within the viewing frustum, the parsing module 315 may be adapted to determine the X and Y coordinates of the building relative to the view provided by the interface module 305a.

The X and Y coordinates obtained by the parsing module 315 may be utilized by the assembly module 325 to associate metadata with a particular pixel or area pixels (also determined by a second set of X and Y coordinates) of the captured image that correspond to the X and Y coordinates of the object determined by the parsing module 315. Therefore, the X and Y coordinates of the captured image may be directly or indirectly correlated to the X and Y coordinates of the view as determined by the viewing frustum.

According to some embodiments, the parsing module 315 may be adapted to determine an area of pixels that correspond to the particular geometrical configuration of an object located within the captured image. For example, the parsing module 315 may be adapted to generate a rectangular area that approximates the size of the object located within the captured image.

Therefore, the assembly module 325 may then intelligently append the metadata corresponding to the object to the pixels of the captured image file to establish a hotspot. The assembly module 325 appends or otherwise associates the metadata with particular X and Y coordinates of the captured image such that when hotspots are moused over, the metadata associated with the hotspot may be displayed on the display device of the computing system.

In some embodiments, the assembly module 325 may also append additional types of metadata to the captured image, such as the at least one condition that prompted the generation of the enhanced screenshot. This functionality allows users to determine, for example, the conditions under which another user generates enhanced screenshots to allow users to learn and adapt to the playing habits of other users.

In some embodiments, the assembly module 325 may generate an enhanced screenshot in the form of an extensible markup language (XML) document that includes one or more captured image files indicative of the view. The locations of the objects relative to the view may be mapped to the pixels of the image file as stated previously, such that mousing over a hotspot indicative of an object causes metadata associated with the object to be displayed in a popup window. The XML document may be enhanced by appending or otherwise associating metadata tags with each object that are indicative of the metadata corresponding to the object. Broadly speaking, the association of metadata tags with the image file produces the enhanced screenshot.

In additional embodiments, rather than, or in addition to, storing the enhanced screenshots as extensible markup language documents, the screenshot generation module 310 may be adapted to provide the enhanced screenshot to the interface module 305a of the computer program 300. The interface module 305a may be adapted to provide the enhanced screenshot in conjunction with a current view (e.g., user interface) of the program environment. Although not shown, the enhanced screenshot may be provided by the interface module 305a as a window within the current view of the program environment.

According to other embodiments, enhanced screenshots may be utilized as the basis for a game achievement function included in the executable instructions. For example, users may be elicited to obtain enhanced screenshots of one or more objects located somewhere within the program environment. In return for obtaining the required enhanced screenshots, the user is provided an award, bonus, or other object indicative of an achievement such as a badge or a virtual trophy.

Criteria for providing the award may be predefined within the executable instructions and may include a type or an amount of metadata that may be located within the enhanced screenshot to merit the provision of the award. By way of non-limiting example, the executable instructions may be adapted to entice the user to obtain enhanced screenshots of a particular animal roaming through the program environment. In exchange for obtaining an enhanced screenshot that includes the particular animal, the executable instructions may be adapted to provide the user with a bonus of additional health.

In additional embodiments, the screenshot generation module 310 may be adapted to utilize automatic metadata grouping to organize two or more enhanced screenshots according to metadata associated with the enhanced screenshots. For example, two or more enhanced screenshots indicative of a particular location may both include the same object such as a home base of the user. As such, the object includes a metadata tag of "Home Base," the screenshot generation module 310 may organize or otherwise associate the two enhanced screenshots together. Enhanced screenshots may be stored locally in a folder on the computing system 105 of the user, or may be stored within a database resident on a network-enabled server (not shown) that is operatively connected to the application server 110.

Also, although not shown, the screenshot generation module 310 may be adapted to generate enhanced screenshots in a format that may be utilized in conjunction with a social network. For example, multiple users may gather together at a particular location within the program environment and obtain an enhanced screenshot, similar to a group photo. As stated previously, the assembly module 325 of the screenshot generation module 310 may be adapted to append metadata such as a name or other suitable identifying information to each user's avatar. Therefore, the social network may utilize the metadata tags associated with the enhanced screenshot to operatively associate the user's social network profile with the enhanced screenshot.

One of ordinary skill in the art will appreciate the broad applicability of providing a social network with an enhanced screenshot that includes a captured image having appended metadata tags that have been mapped to the pixels of the captured image. This functionality is in contrast to the current methods that require a user to append metadata to the image after the user has uploaded the image to the social network. Rather than relying on human action to properly associate metadata with objects located within the image, the social network receives the captured image from the screenshot generation module 310 in an enhanced screenshot form.

In some embodiments, the screenshot generation module 310 may be adapted to export or otherwise provide (e.g., publish) an enhanced screenshot as a webpage that may be provided for distribution via the Internet. As such, end users viewing the enhanced screenshot as a webpage may learn about videogame play, program environment appearance, playing habits of the end user, or other pertinent information provided by the enhanced screenshot.

Figure 4:
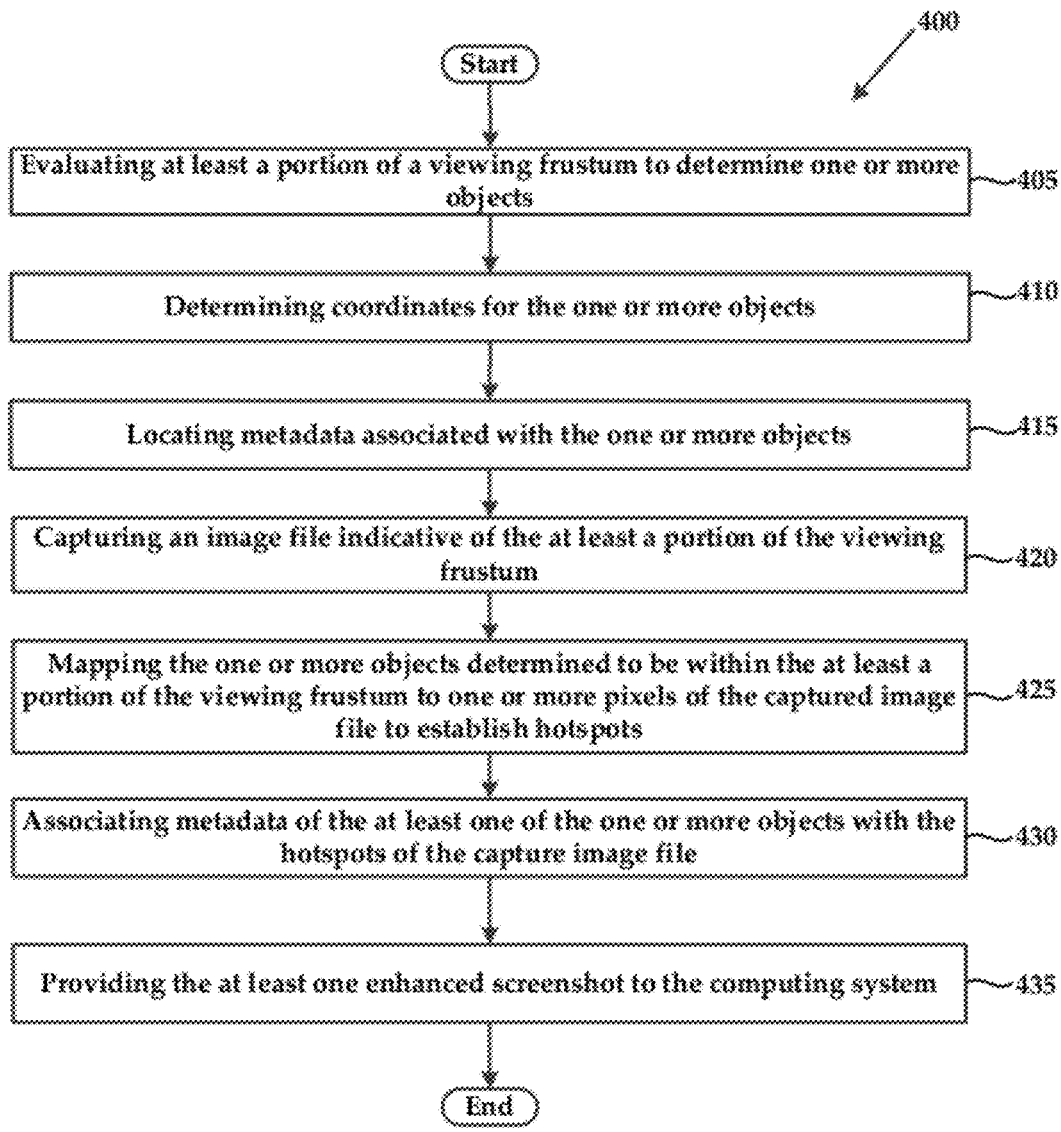
FIG. 4 is an exemplary flow chart of a method for generating enhanced screenshots.

Referring now to FIG. 4, a method 400 for generating enhanced screenshots may include a step 405 of evaluating at least a portion of a viewing frustum generated by a computer program to determine one or more objects included therein. After evaluating the viewing frustum, the method 400 may include obtaining metadata associated with at least one of the one or more objects that were identified in step 405 by executing a step 410 of determining coordinates for the at least one of the one or more objects indicative of a location of the at least one of the one or more objects within a program environment of the computer program.

According to some embodiments, the method 400 may include a step 415 of locating metadata associated with the one or more objects based upon the determination coordinates of the one or more objects in step 410.

According to some embodiments, the method 400 may include generating at least one enhanced screenshot indicative of the at least a portion of the view representative of the viewing frustum by way of step 420. The method may also include a step 425 of mapping the one or more objects determined to be within the at least a portion of the viewing frustum to one or more pixels of the captured image file to establish hotspots.

Next, the method 400 may include a step 430 of associating metadata of the at least one of the one or more objects with the hotspots. It will be understood that mousing over a hotspot causes at least a portion of the metadata corresponding thereto to be displayed. Lastly, the method 400 may include a step 435 of providing the at least one enhanced screenshot to a computing system.

Figure 5:
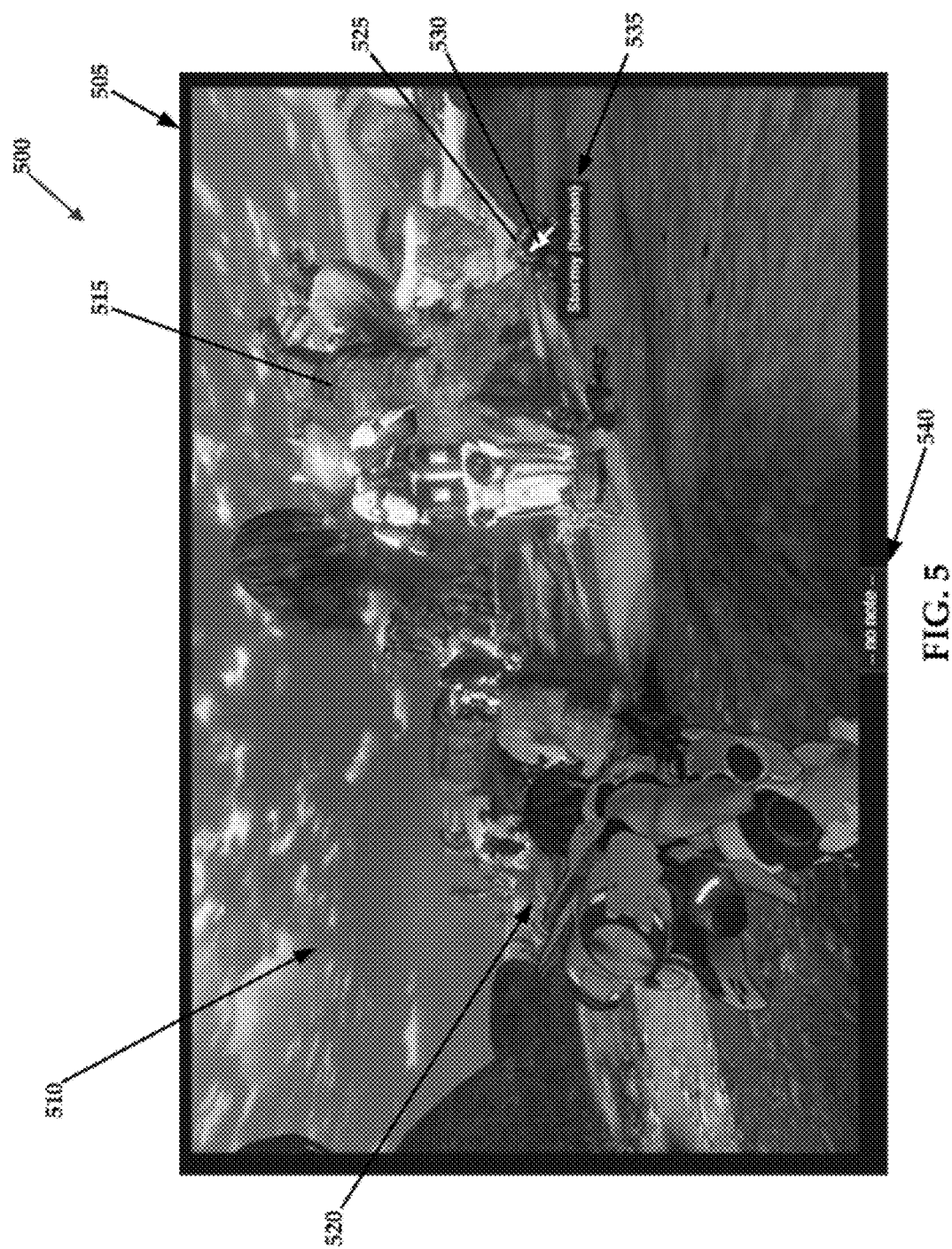
FIG. 5 is an illustrative example of an enhanced screenshot.

Referring now to FIG. 5, an illustrative example of an enhanced screenshot 500 is shown. The enhanced screenshot 500 includes a captured image file 505 representative of the viewing frustum generated by executable instructions stored in memory. The captured image file 505 may include visual depictions of a landscape 510 having a plurality of objects, both inanimate 515 (e.g., rocks, trees, etc.) and animate 520 (e.g., avatars corresponding to users).

At least one hotspot 525 indicative of an object is shown as being selected by a pointer 530 indicative of the location of a mouse relative to the captured image file 505. Upon a mouseover of the at least one hotspot 525 with the pointer 530, metadata associated with the at least one hotspot 525 is displayed as textual information 535 in a popup window located proximate the at least one hotspot 525. If necessary, additional metadata corresponding to the at least one hotspot 525 may be displayed in an additional location 540, such as below the captured image file 505.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents

What is claimed is:

1. A system for generating enhanced screenshots, the system comprising:
   a memory for storing executable instructions adapted to generate a viewing frustum approximating a user's field of view of a three-dimensional game program environment containing a landscape and plurality of objects, the viewing frustum used for locating one or more frustum objects that are located within the viewing frustum relative the program environment;
   a processor for executing the executable instructions stored in the memory, the executable instructions further including a screenshot generation module that includes:
      a parsing module adapted to evaluate at least a portion of the viewing frustum to determine one or more of the frustum objects included within the evaluated portion of the viewing frustum;
      an analysis module adapted to obtain metadata associated with each of the one or more frustum objects within the evaluated portion of the viewing frustum;
      an assembly module adapted to generate an enhanced screenshot indicative of the evaluated portion of the viewing frustum by associating the metadata of each of the one or more frustum objects within the evaluated portion of the viewing frustum with a location of each of one or more respective screenshot objects within the enhanced screenshot to create one or more hotspots indicative of each of the one or more screenshot objects within the enhanced screenshot such that selection of at least one hotspot by a computing system causes at least a portion of the metadata associated with the at least one selected hotspot to be displayed on a display device of the computing system; and
   an interface module adapted to provide the enhanced screenshot to the computing system for display on the display device of the computing system.

2. The system according to claim 1, wherein metadata includes run time metadata obtained by the analysis module.

3. The system according to claim 1, wherein the analysis module is adapted to obtain metadata associated with each of the frustum objects by:
   determining coordinates for each of the frustum objects indicative of a location of each of the frustum objects within the program environment of the three-dimensional game generated by the executable instructions; and locating metadata associated with the each of the one or more screenshot objects within the enhanced screenshot based upon the determined coordinates of each of the frustum objects.

4. The system according to claim 1, wherein the analysis module is further adapted to append the metadata to each of the one or more objects within the enhanced screenshot as one or more metadata tags.

5. The system according to claim 4, wherein the assembly module is adapted to associate two or more enhanced screenshots together that each include at least one object having at least one metadata tag in common.

6. The system according to claim 1, wherein the assembly module is adapted to generate enhanced screenshot updates at predetermined intervals of time in such a way that screenshot objects are rendered based on animate objects that have entered into the viewing frustum and screenshot objects are removed based on animate objects that have exited the viewing frustum.

7. The system according to claim 1, wherein the assembly module is adapted to generate at least one enhanced screenshot upon receiving a request to obtain an enhanced screenshot from the computing system.

8. The system according to claim 1, wherein the assembly module is further adapted to generate at least one enhanced screenshot upon an occurrence of the parsing module determining a threshold number of avatars having entered into the viewing frustum and a particular type of object being located within the viewing frustum.

9. The system according to claim 1, wherein the assembly module is adapted to include data indicative of at least one condition that predicated the generation of the enhanced screenshot as metadata that is appended to the at least one enhanced screenshot.

10. The system according to claim 1, further comprising a screenshot management module adapted to receive user-defined information indicative of a threshold and a number of avatars located within the viewing frustum exceeding the threshold.

11. The system according to claim 1, wherein the assembly module is adapted to provide the at least one enhanced screenshot in an extensible markup language format document to the computing system.

12. The system according to claim 1, wherein the assembly module is adapted to provide the at least one enhanced screenshot from a point of view of an object within the viewing frustum in combination with a current view generated by the executable instructions indicative of the evaluated portion of the viewing frustum.

13. The system according to claim 1, wherein the analysis module is adapted to generate comparative metadata indicative of a comparison of the metadata of a first object located within the viewing frustum and the metadata of one or more additional objects also located within the viewing frustum when the at least one enhanced screenshot was generated.

14. The system according to claim 1, wherein the assembly module is adapted to provide, to the computing system, the at least one enhanced screenshot in a format adapted to allow sharing the at least one enhanced screenshot via a social network.

15. The system according to claim 1, wherein the interface module is adapted to generate a view from the evaluated portion of the viewing frustum.

16. The system according to claim 15, wherein the assembly module is adapted to generate two or more enhanced screenshots captured from two or more points of view relative to the viewing frustum.

17. The system according to claim 1, wherein the assembly module is further adapted to generate a plurality of enhanced screenshots that are arranged as an enhanced video, the at least one enhanced video adapted to provide the evaluated portion of the metadata associated with at least one object upon receiving input indicative of a selection of the at least one object by the computing system.

18. The system according to claim 15, wherein the assembly module is adapted to:
    capture an image file indicative of the evaluated portion of the view;
    map each of the one or more objects determined to be within the evaluated portion of the view to one or more pixels of the captured image file to establish a hotspot; and
    associate the metadata of each of the one or more objects with a corresponding hotspot on the captured image file such that selection of the hotspots cause the evaluated portion of the metadata corresponding to the hotspots to be displayed in a popup window located proximate the hotspots.

19. The system according to claim 18, wherein the assembly module is further adapted to determine an area corresponding to a geometrical configuration of the at least one of the one or more objects.

20. A method for generating enhanced screenshots, the method comprising:
    representing of a user's field of view of a three-dimensional game program environment containing a plurality of game objects using a viewing frustum;
    evaluating the viewing frustum to identify one or more frustum objects located within the viewing frustum using a parsing module;
    determining a location of the one or more frustum objects relative the program environment using the viewing frustum;
    generating a screenshot of the user's field of view, the screenshot including rendered frustum objects based on the determined locations of the frustum objects within the program environment using a screen generation module;
    obtaining metadata associated with each of the one or more frustum objects based on the determined locations of the frustum objects within the program environment, using an analysis module;
    associating the obtained metadata of each of the frustum objects with a location within the screenshot of a respective screenshot object using an assembly module;
    creating a hotspot for each location of the screenshot objects associated with metadata within the screenshot using the assembly module;
    receiving a selection of a hotspot from a computing system using an interface module; and
    displaying metadata associated with the selected hotspot to enhance the screenshot on a display device of the computing system using the interface module.

\* \* \* \* \*

UNITED STATES PATENT AND TRADEMARK OFFICE
CERTIFICATE OF CORRECTION

| | | |
|---|---|---|
| PATENT NO. | : 8,478,767 B2 | Page 1 of 1 |
| APPLICATION NO. | : 13/536971 | |
| DATED | : July 2, 2013 | |
| INVENTOR(S) | : Kern et al. | |

It is certified that error appears in the above-identified patent and that said Letters Patent is hereby corrected as shown below:

On the title page, item [73] should read:

Assignee: Red 5 Studios, Inc., Laguna Hills, CA (US)

Signed and Sealed this
First Day of October, 2013

Teresa Stanek Rea
*Deputy Director of the United States Patent and Trademark Office*